United States Patent
To et al.

(10) Patent No.: US 10,860,358 B2
(45) Date of Patent: Dec. 8, 2020

(54) VIRTUALIZING DATACENTER BRIDGING SETTINGS FOR VIRTUAL NETWORK ADAPTERS

(71) Applicant: Microsoft Technology Licensing, LLC, Redmond, WA (US)

(72) Inventors: Khoa Anh To, Redmond, WA (US); Omar Cardona, Bellevue, WA (US); Daniel Firestone, Redmond, WA (US); Alireza Dabagh, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 15/711,624

(22) Filed: Sep. 21, 2017

(65) Prior Publication Data

US 2019/0087214 A1    Mar. 21, 2019

(51) Int. Cl.

| G06F 9/455 | (2018.01) |
|---|---|
| H04L 12/851 | (2013.01) |
| H04L 12/911 | (2013.01) |
| H04L 12/46 | (2006.01) |
| H04L 12/869 | (2013.01) |
| H04L 12/24 | (2006.01) |
| H04L 12/927 | (2013.01) |
| H04L 12/813 | (2013.01) |

(52) U.S. Cl.
CPC ........ *G06F 9/45558* (2013.01); *H04L 12/462* (2013.01); *H04L 41/0806* (2013.01); *H04L 41/0893* (2013.01); *H04L 47/20* (2013.01); *H04L 47/2408* (2013.01); *H04L 47/58* (2013.01); *H04L 47/805* (2013.01); *H04L 47/828* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 8,027,354 | B1 | 9/2011 | Portolani et al. |
| 8,582,462 | B2 * | 11/2013 | Sharma ................. G06F 9/5077 370/252 |
| 9,172,655 | B1 * | 10/2015 | Dropps ................. H04L 49/254 |
| 9,999,030 | B2 * | 6/2018 | Gu ....................... H04L 67/1095 |
| 10,567,228 | B2 * | 2/2020 | Harneja .............. H04L 41/0893 |

(Continued)

OTHER PUBLICATIONS

"Non Final Office Action Issued in U.S. Appl. No. 15/711,733", dated Nov. 26, 2018, 21 Pages.

(Continued)

*Primary Examiner* — Abu Zar Ghaffari
(74) *Attorney, Agent, or Firm* — Ray Quinney & Nebeker; Tiffany Healy

(57) ABSTRACT

Methods and devices for determining settings for a virtual machine may include partitioning a physical network into a plurality of traffic classes. The methods and devices may include determining at least one virtual enhanced transmission selection (ETS) setting for one or more virtual machines, wherein the virtual ETS setting includes at least one virtual traffic class that corresponds to one of the plurality of traffic classes. The methods and devices may include transmitting a notification to the one or more virtual machines identifying the virtual ETS setting.

18 Claims, 8 Drawing Sheets

(56) References Cited

U.S. PATENT DOCUMENTS

| | | | | |
|---|---|---|---|---|
| 2005/0114541 | A1* | 5/2005 | Ghetie | H04L 47/10 709/232 |
| 2008/0219253 | A1* | 9/2008 | Pozhenko | H04L 47/2475 370/389 |
| 2009/0125631 | A1* | 5/2009 | Blom | H04L 41/5003 709/228 |
| 2010/0303075 | A1* | 12/2010 | Tripathi | G06F 13/385 370/392 |
| 2011/0007746 | A1* | 1/2011 | Mudigonda | G06F 9/45558 370/395.21 |
| 2011/0035494 | A1* | 2/2011 | Pandey | G06F 9/5077 709/224 |
| 2011/0035498 | A1 | 2/2011 | Shah et al. | |
| 2011/0176551 | A1* | 7/2011 | Chawla | H04L 41/0213 370/395.31 |
| 2012/0047293 | A1* | 2/2012 | Otani | G06F 3/061 710/30 |
| 2013/0166753 | A1* | 6/2013 | Armstrong | H04L 47/78 709/226 |
| 2013/0194926 | A1* | 8/2013 | DeCusatis | H04L 47/828 370/235 |
| 2014/0307554 | A1 | 10/2014 | Basso et al. | |
| 2015/0029848 | A1* | 1/2015 | Jain | H04L 47/6215 370/235 |
| 2015/0172183 | A1 | 6/2015 | Decusatis et al. | |
| 2016/0112305 | A1* | 4/2016 | Djekic | H04L 12/54 370/235 |
| 2016/0182383 | A1* | 6/2016 | Pedersen | H04L 45/24 709/226 |
| 2016/0241491 | A1* | 8/2016 | Tripathi | H04L 49/1523 |
| 2016/0373362 | A1* | 12/2016 | Cheng | H04L 47/2433 |
| 2017/0155599 | A1 | 6/2017 | Vobbilisetty et al. | |
| 2018/0357109 | A1* | 12/2018 | Mithal | G06F 9/5077 |

OTHER PUBLICATIONS

"Non Final Office Action Issued in U.S. Appl. No. 15/711,774", dated Nov. 9, 2018, 16 Pages.

"International Search Report and Written opinion Issued in PCT Application No. PCT/US2018/039204", dated Sep. 17, 2018, 13 Pages.

"International Search Report and Written opinion Issued in PCT Application No. PCT/US2018/039206", dated Sep. 17, 2018, 13 Pages.

"International Search Report and Written Opinion Issued in PCT Application No. PCT/US2018/039207", dated Sep. 17, 2018, 14 Pages.

Recio, et al., "Automated Ethernet Virtual Bridging", In Proceedings of 21st International Teletraffic Congress (ITC 21), Sep. 15, 2009, 11 Pages.

"Final Office Action Issued in U.S. Appl. No. 15/711,774", dated May 1, 2019, 21 Pages.

* cited by examiner

| Traffic Class | Physical Priority | PFC enabled |
|---|---|---|
| 0 | 0,1,2,3 | No |
| 1 | 4,5 | No |
| 2 | 6 | Yes |
| 3 | 7 | Yes |

FIG. 2

| Virtualized Priority | 0 | 1 | 2 | 3 | 4 | 5 | 6 | 7 |
|---|---|---|---|---|---|---|---|---|
| Physical Priority | 5 | 6 | 5 | 5 | 5 | 5 | 5 | 5 |

| Traffic Class | Physical Priority | PFC enabled |
|---|---|---|
| 0 | 0, 2-7 | No |
| 1 | 1 | Yes |

FIG. 3

VIRTUALIZING DATACENTER BRIDGING SETTINGS FOR VIRTUAL NETWORK ADAPTERS

RELATED APPLICATIONS

This application contains subject matter related to U.S. patent application entitled "Virtualizing DCB Settings for Virtual Network Adapters" filed Sep. 21, 2017 and U.S. patent application entitled "Virtualizing DCB Settings for Virtual Network Adapters" filed Sep. 21, 2017. The entirety of each of the foregoing applications is hereby incorporated by reference herein.

BACKGROUND

The present disclosure relates to virtual networks.

Network and host administrators configure Datacenter Bridging (DCB) settings for each physical hop in the network to segment the data pipe into multiple traffic classes (TCs) throughout the network. Applications then tag traffic properly with 802.1p priority tags, so that the traffic can be classified into one of the traffic classes. This enables end-to-end quality of service for different traffic types, based on the settings for the traffic class with which the traffic is associated. Most end-users, however, are not familiar with DCB technology, and/or are not aware of how DCB is configured in the network. The issue is further magnified for applications inside a virtual machine, since the virtual machine administrator might not be allowed to see the DCB settings of the underlying physical network.

Applications on top of virtual network interface controllers (NIC)s, such as applications inside virtual machines, currently do not have a standard mechanism to programmatically discover the datacenter bridging (DCB) policy that the host administrator has configured for a virtual NIC. Therefore DCB-aware applications cannot move seamlessly between native and virtualization environments.

Generally, a virtual machine administrator would learn about the DCB policy configured for that virtual NIC through some out-of-band mechanism, and hardcode the information to the DCB applications running on top of the virtual NICs. This prevents the ability of the applications to auto-discover DCB capabilities, as they would do on top of physical NICs, and therefore requires manual intervention from the virtual machine administrator if the DCB policy changes, or if the applications move to a different environment.

Thus, there is a need in the art for improvements in virtual network communications.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and an operating system in communication with the processor and the memory, wherein the operating system is operable to: partition a physical network into a plurality of traffic classes; determine at least one virtual enhanced transmission selection (ETS) setting for one or more virtual machines, wherein the virtual ETS setting includes at least one virtual traffic class that corresponds to one of the plurality of traffic classes; and transmit a notification to the one or more virtual machines identifying the virtual ETS setting.

Another example implementation relates to a method for determining settings for a virtual machine. The method may include partitioning, at an operating system on a computer device, a physical network into a plurality of traffic classes. The method may include determining at least one virtual enhanced transmission selection (ETS) setting for one or more virtual machines, wherein the virtual ETS setting includes at least one virtual traffic class that corresponds to one of the plurality of traffic classes. The method may include transmitting a notification to the one or more virtual machines identifying the virtual ETS setting.

Another example implementation relates to computer-readable medium storing instructions executable by a computer device. The computer-readable medium may include at least one instruction for causing the computer device to partition a physical network into a plurality of traffic classes. The computer-readable medium may include at least one instruction for causing the computer device to determine at least one virtual enhanced transmission selection (ETS) setting for one or more virtual machines, wherein the virtual ETS setting includes at least one virtual traffic class that corresponds to one of the plurality of traffic classes. The computer-readable medium may include at least one instruction for causing the computer device to transmit a notification to the one or more virtual machines identifying the virtual ETS setting.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 2 is an example physical priority mapping table in accordance with an implementation of the present disclosure;

FIG. 3 is an example virtual priority mapping table in accordance with an implementation of the present disclosure;

DETAILED DESCRIPTION

Figure 1:
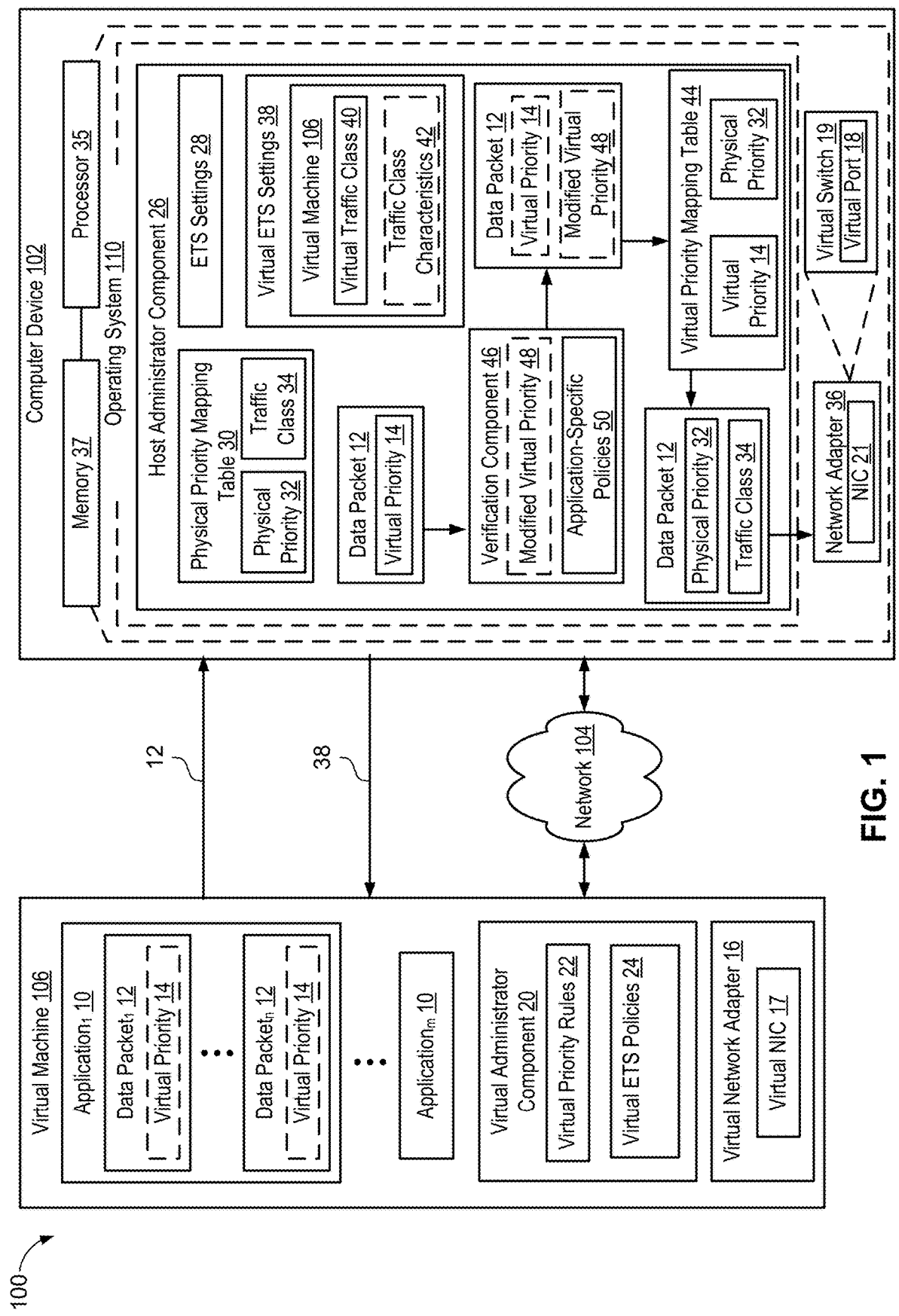
FIG. 1 is a schematic block diagram of example computer devices in accordance with an implementation of the present disclosure.

This disclosure relates to devices and methods for providing virtualized ETS information to virtual machines so that applications operating in the virtual environment may work in a similar manner as applications operating in a native environment. In addition, the devices and methods may restrict data traffic received from virtual machines to a subset of traffic classes and may further specify restrictions for different traffic types.

In a native environment, the physical NIC advertises its DCB capabilities and current settings to the operating system (OS) stack. Applications and administrators on top of those physical NICs can programmatically query the DCB settings and determine how to properly tag the traffic for the applications. As such, applications can tag traffic with different priority values in order to steer outgoing traffic to a desired traffic class. Moreover, for NIC-generated traffic, such as remote direct memory access (RDMA), administrators may use network quality of service (NetQoS) policies to tag data packets with desired priority values.

Virtual NICs (or vNICs) inside virtual machines are generally not DCB capable. For example, virtual NICs may not advertise to a virtual operating system as being DCB capable. As such, virtual machines may not be able to query for the DCB settings and/or discover the DCB settings. Moreover, even if a virtual operating system sends DCB commands, virtual NICs may not respond to DCB commands received. As such, DCB-aware applications cannot move seamlessly between native and virtualization environments. Moreover, applications inside virtual machines generally do not have visibility into how priority tagging may affect the traffic from the applications. For example, applications within a virtual machine may not understand which priority value to tag traffic with to ensure the data packets are transmitted on a lossless traffic class. Furthermore, a host administrator may have limited options on restricting priorities on data packets coming out of a virtual machine. Typically, the host administrator may either allow virtual machines to send traffic with no priorities or send traffic with all priorities. In addition, there may not be an option for specifying RDMA traffic associated with the same network direct port (NDPort) numbers (e.g., server message block (SMB) traffic) for different virtual ports (vPorts) with different priority values.

The devices and methods may allow virtual machine administrators and applications to behave as they would in native environment, by virtualizing the ETS information that the host administrator may configure for the virtual NIC, and expose the ETS information to the virtual NIC. The devices and methods may provide the host administrator the ability to restrict outgoing traffic from each vPort to a subset of physical priorities. Each vPort may be associated with a virtual NIC (e.g., a virtual NIC is connected to a vPort). As such, any policy configured for a specific vPort may only affect traffic to and/or from that virtual NIC. The host administrator may specify which priorities each vPort may be allowed to use. The host administrator may further specify restrictions for different traffic types. For example, the host administrator may specify that a vPort can use priorities 2, 3, and 4, and furthermore, RDMA traffic is restricted to only priority 3 and 4.

The devices and methods may present applications operating in the virtual machines with virtual ETS settings information and not the ETS settings of the physical network. For example, the virtual NICs may expose the information to the virtual operating system stack, as if they are DCB-capable NICs, by using existing DCB mechanism already supported by the operating system in the virtual machine. The virtual ETS information may specify how (virtual) priorities are mapped to (virtual) traffic classes, just as in native environment. The virtual traffic classes (TCs) may correspond to the physical traffic classes that the host administrator allows the virtual machine to send traffic on.

As such, applications in the virtual machines may tag packets with any virtual priority values. When packets are sent to the host, the virtual priorities may be re-written by the host-side entity to one of the allowed physical priorities. The ability of the host operating system and hardware to re-write packet priorities provides the mechanism for the host administrator to ensure that packets sent from the virtual machine may only go out on the channel with specified priority values, regardless of how they are tagged (or not tagged) inside the virtual machine.

In addition to priority re-writes based on a mapping table (that the host operating system provides for each vPort), the methods and devices may also further restrict traffic of certain types to a subset of the host-side priorities, if specified by the host administrator. For example, with priority re-writes, all traffic coming out of a vPort may have the virtual priorities re-mapped to physical priorities 2, 3, or 4. The host administrator may further specify, for example, that "RDMA traffic can only use priorities 3 and 4, and RDMA packets not mapped to 3 or 4 will be mapped to priority 3." As such, RDMA traffic with virtual priorities mapped to physical priorities 3 or 4 will not need any further mapping. However, RDMA traffic with virtual priorities mapped to physical priority 2 will be mapped to priority 3 instead.

By providing traffic type restrictions, backward compatibility may be provided to virtual administrator components 20 and/or applications 10 that are not aware of or know to query for DCB information. For example, if a virtual machine sends untagged Ethernet and RDMA traffics, which maps to the same priority/TC on the host side, the host administrator may steer RDMA traffic to a different (maybe lossless) TC while keeping Ethernet traffic on the original TC. Additionally, traffic type restrictions may allow NICs to offer a limited tenant DCB feature if they do not support mapping of virtual to physical priorities. In that case, DCB setting for the virtual NIC will not be virtualized. Priorities of packets out of the vPort will not be re-mapped to a list of allowed priorities. Instead, packets with priorities outside of the allowed priority set will be dropped.

By virtualizing ETS information to virtual machines, the virtual machines may tag traffic with any priority value the virtual machines may want, in a similar manner to native environments (where there is no restriction on which priorities applications can tag traffic with). In addition, virtualizing ETS information to virtual machines may allow DCB-aware virtual machine applications to work the same way they would in native environment.

As such, the devices and methods ensure that regardless of whether the applications properly classify traffic, the host administrator may ensure that uninformed and/or malicious applications transmit traffic onto the physical network with proper DCB priority tags, so that the traffic may be on the assigned class of service (e.g., the correct DCB traffic class) for the applications.

Referring now to FIG. 1, an example system 100 for providing virtualized ETS information to virtual machines so that applications operating in the virtual environment may work in a similar manner as applications operating in a native environment. System 100 may include one or more virtual machines 106 in communication with one or more computer devices 102 over a network 104. A virtual machine 106 may include, for example, software emulations that have the same characteristics as physical computers. In addition, virtual machines 106 may include a complete operating system capable of running applications 10 independently of other virtual machines 106. Computer devices 102 may host one or more virtual machines 106 and may intercept all packets coming in and out of virtual machines 106. For example, computer device 102 may include a network adapter 36 that includes a network interface controller (NIC) 21 in communication with a virtual switch 19 and a virtual port 18 that computer device 102 may use to intercept packets coming in and out of virtual machines 106. Virtual machines 106 may also include a virtual administrator component 20 operable to manage external communications via computer device 102 using virtual network adapter 16 and virtual NIC 17. Each virtual port 18 may be associated with a virtual NIC 17 (e.g., a virtual NIC 17 is connected to a virtual port 18). As such, any policy configured for a specific virtual port 18 may only affect traffic to and/or from the virtual NIC 17 associated with the virtual port 18.

Computer device 102 may include an operating system 110 executed by processor 35 and/or memory 37 of computer device 102. Memory 37 of computer device 102 may be configured for storing data and/or computer-executable instructions defining and/or associated with operating system 110, and processor 35 may execute operating system 110. An example of memory 37 can include, but is not limited to, a type of memory usable by a computer, such as random access memory (RAM), read only memory (ROM), tapes, magnetic discs, optical discs, volatile memory, non-volatile memory, and any combination thereof. An example of processor 35 can include, but is not limited to, any processor specially programmed as described herein, including a controller, microcontroller, application-specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

NIC 21 may communicate with a host administrator component 26 in order to manage data traffic for each physical hop in the physical network. For example, host administrator component 26 may partition the network adapter 36 transmit pipe into multiple Enhanced Transmission Selection (ETS) channels and assign traffic classes 34 to each ETS channel. Different ETS channels may have different quality of service for traffic transmitted on the ETS channel. For example, one channel may provide lossless traffic, while another channel may periodically drop data packets transmitted on the channel and/or have a delay in transmission. In addition, each traffic class may be allocated a percentage of available bandwidth to use for transmitting traffic. Network adapters 36 operating on the same physical network may be partitioned the same way so the entire network has consistent channel partitioning.

Host administrator component 26 may also configure ETS settings 28 for the physical network and virtual ETS settings 38 for virtual machines 106 and may communicate ETS settings 28 and the virtual ETS settings 38 to NIC 21. For example, host administrator component 26 may assign physical priorities 32 for data packets to a specific traffic class 34. Physical priorities 32 may correspond to 802.1p priorities (e.g., 0 to 7) and may be used for tagging data packets that are transmitted on the physical network. Applications may tag data traffic with 802.1p priority tags, so that the data traffic may be classified into one of the traffic classes. This enables end-to-end quality of service for different data traffic types, based on the settings for the traffic class. As such, the physical priorities 32 may determine an ETS traffic channel the data packet may be transmitted on in the physical network. A traffic class 34 may have one or more physical priorities 32 assigned to the traffic class 34. Thus, data packets with different physical priorities 32 may be transmitted on the same traffic channel. Host administrator component 26 may store the associations between the physical priority 32 and the traffic class 34, for example, in a physical priority mapping table 30, although other mechanisms of storing the associations may be utilized.

For instance, referring now to FIG. 2, an example physical priority mapping table 30 for traffic classes 34 may be configured by host administrator component 26 for the physical NIC. For example, physical priority mapping table 30 may identify one or more traffic classes 34 on the physical network. In addition, host administrator component 26 may associate one or more physical priorities 32 to a respective traffic class 34 and may identify whether the traffic channel is Priority-based Flow Control (PFC) enabled 202, e.g., by listing the associated information in a same row of the table 30. For example, traffic class 0 may be mapped to priority values 0, 1, 2, and 3 and may not be PFC enabled, traffic class 1 may be mapped to priority values 4 and 5 and may not be PFC enabled, and traffic class 2 may be mapped to priority value 6 and may be PFC enabled, and traffic class 3 may be mapped to priority 7 and may be PFC enabled.

Referring back to FIG. 1, host administrator component 26 may be further operable to restrict data traffic received from virtual machines 106 by specifying which traffic classes 34 each virtual machine 106 may be allowed to use. Host administrator component 26 may determine virtual ETS settings 38 for each virtual machine 106. The virtual ETS settings 38 may include, but are not limited to, one or more virtual traffic classes 40 assigned to virtual machine 106 and traffic class characteristics 42 (e.g., lossless traffic channel). The virtual traffic classes 40 may correspond to the physical traffic classes 34 that host administrator component 26 allows virtual machine 106 to send traffic on. For example, host administrator component 26 may provide access to four traffic channels (e.g., Ethernet, RDMA, Small Computer System Interface (SCSI), and TCP), where each traffic channel corresponds to a different physical traffic class 34. One virtual machine may pay less relative to other virtual machines and may only receive access to the Ethernet channel. Another virtual machine may pay more relative to other virtual machines and may be able to access all four channels. As such, the virtual ETS settings 38 may be different for each of the virtual machines 106.

The virtual ETS settings 38 information may be generated by using operating system 110 internal heuristics, based on, for example, a tenant DCB policy the host administrator component 26 has configured for a specific virtual port 18. For example, the host administrator component 26 may allow the virtual machine 106 to send traffic on physical priorities 2, 3 and 4, which maps to physical traffic classes on the physical NIC. Furthermore, priority 4 may be PFC enabled on the physical network. Host administrator component 26 may expose the virtual ETS settings 38 to virtual machine 106, where the virtual ETS settings 38 indicate that virtual machine 106 has three TCs, one of which is PFC enabled. For example, priority 0-5 maps to TC0, priority 6 maps to TC1, priority 7 maps to TC2, and is PFC enabled. This enables one or more (e.g., up to m, where m is an integer) DCB-aware applications 10 inside the virtual machine 106 to know that application 10 may send traffic out of three traffic channels, and if application 10 wants to send lossless traffic, application 10 may tag traffic with priority 7.

Host administrator component 26, may transmit a message to virtual machine 106 with the virtual ETS settings 38 for virtual machine 106. A virtual administrator component 20 on virtual machine 106 may receive the virtual ETS settings 38 and may create virtual ETS policies 24 that map from virtual priorities 14 assigned to data packets 12 to the virtual traffic classes 40 received in the virtual ETS settings 38. Virtual administrator component 20 may also create one or more virtual priority rules 22 that determine how applications 10 may tag data packets 12. For example, the virtual priority rules 22 may indicate that SMB storage traffic may be tagged with a virtual priority value 5 and lossless traffic may be tagged with a virtual priority value 7. As such, applications 10 operating on virtual machine 106 may have the ability to tag data packets 12 with any priority value in a similar manner as applications operating in a native environment.

Virtual administrator component 20 and applications 10 may be agnostic of how the virtual priorities 14 are mapped to the physical network. As such, applications 10 may easily move between different host environments. When applications 10 move between different host environments, applications 10 may continue to use the virtual priority rules 22 to tag data packets 12 and may be unaware that a change in host environment occurred. Moreover, by restricting the information provided to virtual administrator component 20 and applications 10 about the physical network, virtual administrator component 20 and/or applications 10 may be less likely to learn information about the physical network. As such, the physical network topology may be protected from virtual machines that may want to harm the physical network and/or perform malicious actions on the physical network.

Virtual NIC 17 may transmit one or more data packets 12 to host administrator component 26 and/or NIC 21 via virtual port 18. Each of the data packets 12 may include a virtual priority 14 assigned to the data packet 12 by application 10 based on one or more virtual priority rules 22.

Host administrator component 26 may include a verification component 46 operable to verify whether the virtual priority 14 of data packet 12 corresponds to application-specific policies 50 that may be defined for application 10. Verification component 46 may check whether the virtual priority 14 of data packets 12 received from application 10 correspond to the correct priority value for the application-specific policy 50. If the virtual priority 14 does correspond to the correct priority value, verification component 46 may not need to perform additional processing on data packet 12. However, if the virtual priority 14 does not correspond to the correct priority value, verification component 46 may need to replace the virtual priority 14 of data packet 12 with a modified virtual priority 48 based on the application-specific policy 50. For example, an application-specific policy 50 may include mapping RDMA traffic to priority value 5. If a RDMA data packet was tagged with a virtual priority value of 2, verification component 46 may replace the virtual priority value 2 with a modified virtual priority value 5. Moreover, if virtual machine 106 sends untagged Ethernet and RDMA traffics, which maps to the same physical priority 32, verification component 46 may use the application-specific policy 50 to tag the RDMA traffic with a physical priority 32 of a different (maybe lossless) traffic class 34, while keeping the Ethernet traffic tagged with the original physical priority 32 that maps to the original traffic class 34. When an application-specific policy 50 does not exist, host administrator component 26 may apply a default virtual priority value for untagged data packets 12 received from virtual port 18. In addition, host administration component 26 may instruct NIC 21 to apply a default virtual priority value for untagged data packets 12 received from virtual port 18.

In addition, host administrator component 26 may use a virtual priority mapping table 44 to replace the virtual priority 14 of the received data packet 12 with a corresponding physical priority 32. Host administrator component 26 may have a virtual priority mapping table 44 for each virtual machine 106. By using the virtual priority mapping table 44, host administrator component 26 may ensure that data packets 12 received from virtual machine 106 are transmitted using the correct physical priorities 32 assigned to the virtual machine 106. Thus, regardless of how virtual machine 106 tagged data packet 12, host administrator component 26 may restrict traffic from virtual machine 106 to the allowed traffic classes 34. If virtual machine 106 attempts to use different traffic channels than the traffic channels assigned to virtual machine 106, the virtual priority mapping table 44 may be used to restrict the data traffic received from virtual machine 106 to the correct traffic channels.

For instance, referring now to FIG. 3, an example virtual priority mapping table 44 associates virtual priority 14 values with a corresponding physical priority 32 value. The physical priority 32 value may also be referred to as a host-side priority, e.g., a priority value established by a host computer device that hosts the virtual machine and intercepts all packets coming in and out of virtual machine 106 in order to re-classify packets with the physical priority 32 values. For example, virtual priority value 0 may correspond to physical priority value 5, virtual priority value 1 may correspond to physical priority value 6, virtual priority value 2 may correspond to physical priority value 5, virtual priority value 3 may correspond to physical priority value 5, virtual priority value 4 may correspond to physical priority value 5, virtual priority value 5 may correspond to physical priority value 5, virtual priority value 6 may correspond to physical priority value 5, and virtual priority value 7 may correspond to physical priority value 5. Virtual priority mapping table 44 may further include priority mappings 302 between the traffic classes 34 and the physical priorities 32 and whether the traffic class 34 is PFC enabled 304. For example, physical priority values 0 and 2-7 may correspond to traffic class 0 and may not be PFC enabled, while physical priority value 1 may correspond to traffic class 1 and may be PFC enabled.

Referring back to FIG. 1, host administrator component 26 may replace the virtual priority 14 of data packet 12 with the corresponding physical priority 32 based on the virtual priority mapping table 44. For example, host administrator component 26 may instruct NIC 21 to replace the virtual priority 14 of data packet 12 with the corresponding physical priority 32 based on the virtual priority mapping table 44. Host administrator component 26 may also use the physical priority mapping table 30 to determine the corresponding traffic class 34 for the physical priority 32. Host administrator component 26 may send data packet 12 with physical priority 32 to network adapter 36 so that data packet 12 may be transmitted on the traffic channel for the corresponding traffic class 34.

Figure 4:
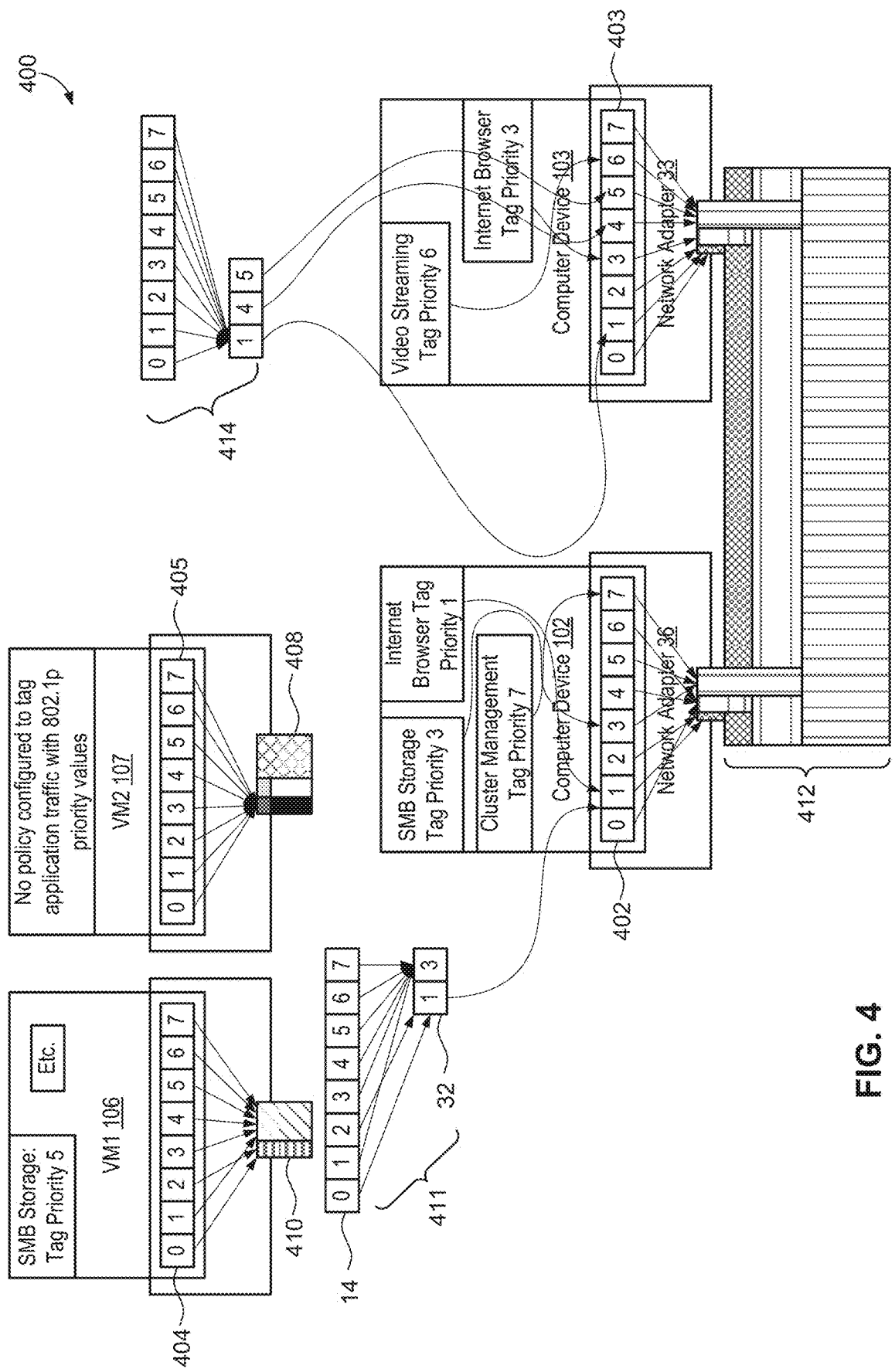
FIG. 4 is a schematic diagram of an example system with two virtual machines in communication with two host computer devices in accordance with an implementation of the present disclosure.

Referring now to FIG. 4, an example system 400 where two virtual machines 106, 107 may communicate with two host computer devices 102, 103 via a virtual network. Virtual machine 107 may be the same as or similar to virtual machine 106 of FIG. 1. In addition, computer device 103 may be the same as or similar to computer device 102 of FIG. 1. Computer devices 102, 103 may execute host administrator component 26 to partition the transmit pipe of the network adapters 36, 33 into multiple ETS channels 412. Network adapters 36, 33 on the same physical network may be partitioned the same way so that the network may have consistent channel partitioning. In addition, applications operating in a native environment on computer devices 102, 103 may tag network data packets with different 802.1p priorities values so that data packets may be classified for transmission over one of the ETS channels 412. For example, applications may tag data packets for SMB storage with a priority 3 value, internet browser data packets with a priority 1 value, video streaming data packets with a priority 6 value, and cluster management data packets with a priority 7 value.

Computer devices 102, 103 may create ETS policies 402, 403 to map the 802.1p priority values to ETS channels 412 (also known as ETS traffic classes) so that data packets may be transmitted on specific ETS channels 412 based on, a priority value of the data packet. For example, ETS policy 402 may map priority values 1 and 2 to a first traffic channel, priority values 0, 4, and 6 to a second traffic channel, and priority values 3, 5, and 7 to a third traffic channel. In addition, ETS policy 403 may map priority values 0-2 to a first traffic channel, priority value 3 to a second traffic channel, and priority values 4-7 to a third traffic channel.

Computer devices 102, 103 may also determine a number of virtual ETS channels 412 that virtual machines 106, 107 may use. Operating systems 110 on computer devices 102, 103 may inform the virtual network adapters 410, 408 in virtual machines 106, 107 the number of virtual ETS channels virtual machines 106, 107 may access, so virtual network adapters 410, 408 may inform the virtual network stack.

For example, virtual machine administrators 20 (FIG. 1) may create virtual ETS policies 404, 405 inside virtual machines 106, 107 to map 802.1p priorities to the virtual ETS channels assigned to virtual machines 106, 107. For example, virtual machine 106 may have two virtual ETS channels assigned to virtual machine 106. As such, virtual ETS policy 404 for virtual machine 106 may map priority values 0 and 2 to traffic channel 1 and may map priority values 1 and 3-7 to traffic channel 2. Virtual machine 107 may have three virtual ETS channels assigned to virtual machine 107.

In addition, applications 10 (FIG. 1) operating in virtual machines 106, 107 may create policies to tag application traffic with 802.1p priorities. For example, applications 10 in virtual machine 106 may tag SMB storage traffic with a priority value 5. However, virtual machine 107 may not have a policy to tag application traffic with 802.1p priority values. As such, all traffic coming from virtual machine 107 may by default go to traffic channel 1.

Host administrator component 26 (FIG. 1) may create a virtual to physical priority mapping table 411 for each virtual machine 106, 107 that maps the virtual priority 14 values to physical priority 32 values. For example, host administrator component 26 may determine that virtual machine 106 may be allowed to use physical priority values 1 and 3 and virtual machine 107 may be allowed to use physical priority values 1, 4, and 5. Thus, regardless of how virtual machines 106, 107 tag traffic, the virtual to physical priority mapping table 411 ensures that traffic coming out of virtual machines 106, 107 may only be tagged with the physical priorities assigned to virtual machines 106, 107. For example, traffic coming out of virtual machine 106 may have the virtual priority values changed to only priority values 1 and 3.

In an implementation, host administrator component 26 may further create application-specific policies for tagging traffic received from applications 10 operating in virtual machines 106, 107. For example, an application-specific policy 414 for virtual machine 107 may indicate that RDMA traffic is tagged with a priority value 5. As data packets are received by host administrator component 26, if RDMA traffic is not already mapped to a priority 5 value, the priority value of the data packet may be changed to a priority value 5. Moreover, application-specific policy 414 may indicate that any non-RDMA traffic may not use physical priority 5. As such, the priority values of non-RDMA traffic may change to a different priority value if the non-RDMA traffic has a priority value 5. Application-specific policy 414 may further indicate that the other traffic may be dropped if the traffic is not mapped to priority values 1 or 4. Regardless of how the applications on the virtual machine and/or the virtual administrator component configure the priority value mappings, the application-specific policy may automatically configure the traffic classification for the data packets based on the application-specific policy. Therefore, if applications misclassify data traffic and/or are unable to classify data traffic, the application-specific policy may ensure traffic is transmitted on the correct traffic channels.

Figure 5:
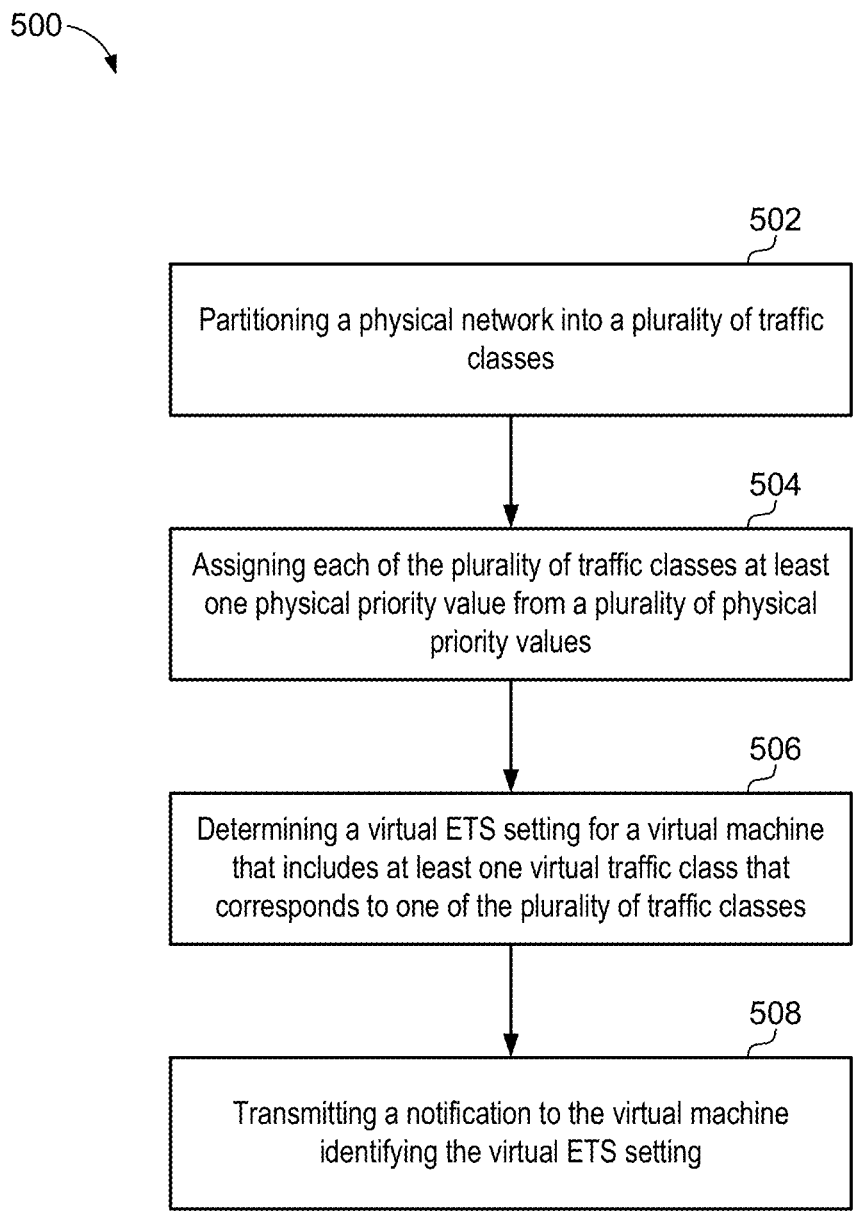
FIG. 5 is a flowchart of an example method for determining virtual ETS settings that a virtual machine may use in accordance with an implementation of the present disclosure.

Referring now to FIG. 5, an example method 500 may be used by host administrator component 26 (FIG. 1) and/or NIC 21 (FIG. 1) of computer device 102 (FIG. 1) to determine virtual ETS settings 38 (FIG. 1) that a virtual machine (FIG. 1) may use.

At 502, method 500 may include partitioning a physical network into a plurality of traffic classes. For example, host administrator component 26 may partition the network adapter 36 transmit pipe into multiple ETS channels and assign traffic classes 34 to each ETS channel. Different ETS channels may have different quality of service for traffic transmitted on the ETS channel. For example, one channel may provide lossless traffic, while another channel may periodically drop data packets transmitted on the channel and/or have a delay in transmission. Network adapters 36 operating on the same physical network may be partitioned the same way so the entire network has consistent channel partitioning. Host administrator component 26 may instruct NIC 21 to partition the network adapter 36 transmit pipe into multiple ETS channels and assign traffic classes 34 to each ETS channel.

At 504, method 500 may include assigning each of the plurality of traffic classes at least one physical priority value from a plurality of physical priority values. Host administrator component 26 may assign physical priorities 32 for data packets to a specific traffic class 34. For example, physical priorities 32 may correspond to 802.1p priorities (e.g., 0 to 7) and may be used for tagging data packets that are transmitted on the physical network. Applications may tag data traffic with 802.1p priority tags, so that the data traffic may be classified into one of the traffic classes. This enables end-to-end quality of service for different data traffic types, based on the settings for the traffic class. As such, the physical priorities 32 may determine an ETS traffic channel the data packet may be transmitted on in the physical network. A traffic class 34 may have one or more physical priorities 32 assigned to the traffic class 34. Thus, data packets with different physical priorities 32 may be transmitted on the same traffic channel. Host administrator component 26 may store the associations between the physical priority 32 and the traffic class 34 in a physical priority mapping table 30.

At 506, method 500 may include determining a virtual ETS setting for a virtual machine that includes at least one virtual traffic class that corresponds to one of the plurality of traffic classes. Host administrator component 26 may determine virtual ETS settings 38 for each virtual machine 106. The virtual ETS settings 38 may include, but are not limited to, one or more virtual traffic classes 40 assigned to virtual machine 106 and traffic class characteristics 42 (e.g., loss less traffic channel). The virtual traffic classes 40 may correspond to the physical traffic classes 34 that host administrator component 26 allows virtual machine 106 to send traffic on. For example, host administrator component 26 may provide access to two channels (e.g., Ethernet and RDMA) to virtual machines 106. One virtual machine may pay less relative to other virtual machines and may only receive access to the Ethernet channel. Another virtual machine may pay more relative to other virtual machines and may be able to access both channels. As such, the virtual ETS settings 38 may be different for each of the virtual machines 106. Host administrator component 26 may use the virtual ETS settings 38 information to restrict data traffic received from virtual machines 106 by specifying which traffic classes 34 virtual machine 106 may use to transmit traffic. In addition, host administrator component 26 may instruct NIC 21 to restrict data traffic received from virtual machine 106 by specifying which traffic classes 34 virtual machine 106 may use.

The virtual ETS settings 38 information may be generated by using operating system 110 internal heuristics, based on, for example, a tenant ETS policy the host administrator component 26 has configured for a specific virtual port 18. For example, the host administrator component 26 may allow the virtual machine 106 to send traffic on physical priorities 2, 3 and 4, which maps to physical TC4, TC5, and TC6 on the physical NIC. Furthermore, priority 4 may be PFC enabled on the physical network. Host administrator component 26 may expose the virtual ETS settings 38 to virtual machine 106, where the virtual ETS settings 38 indicate that virtual machine 106 has three TCs, one of which is PFC enabled. For example, priority 0-5 maps to TC0, priority 6 maps to TC1, priority 7 maps to TC2, and is PFC enabled. This enables DCB-aware applications 10 inside the virtual machine 106 to know that application 10 may send traffic out of three traffic channels, and if application 10 wants to send lossless traffic, application 10 may tag traffic with priority 7.

At 508, method 500 may include transmitting a notification to the virtual machine identifying the virtual ETS setting. Host administrator component 26 may transmit a message to virtual machine 106 with the virtual ETS settings 38 for virtual machine 106. A virtual administrator component 20 on virtual machine 106 may receive the virtual ETS settings 38 and may create virtual ETS policies 24 that map virtual priorities 14 assigned to data packets 12 to the virtual traffic classes 40 received in the virtual ETS settings 38. Virtual administrator component 20 may also create one or more virtual priority rules 22 that determine how applications 10 may tag data packets 12. For example, the virtual priority rules 22 may indicate that SMB storage traffic may be tagged with a virtual priority value 5 and lossless traffic may be tagged with a virtual priority value 7. As such, applications 10 operating on virtual machine 106 may have the ability to tag data packets 12 with any priority value in a similar manner as applications operating in a native environment.

Virtual administrator component 20 and applications 10 may be unaware of how the virtual priorities 14 are mapped to the physical network. As such, applications 10 may easily move between different host environments. When applications 10 move between different host environments, applications 10 may continue to use the virtual priority rules 22 to tag data packets 12 and may be unaware that a change in host environment occurred. Moreover, by restricting the information provided to virtual administrator component 20 and applications 10 about the physical network, virtual administrator component 20 and/or applications 10 may be less likely to learn information about the physical datacenter. As such, the physical network topology may be protected from virtual machines that may want to harm the physical network and/or perform malicious actions on the physical network.

Figure 6:
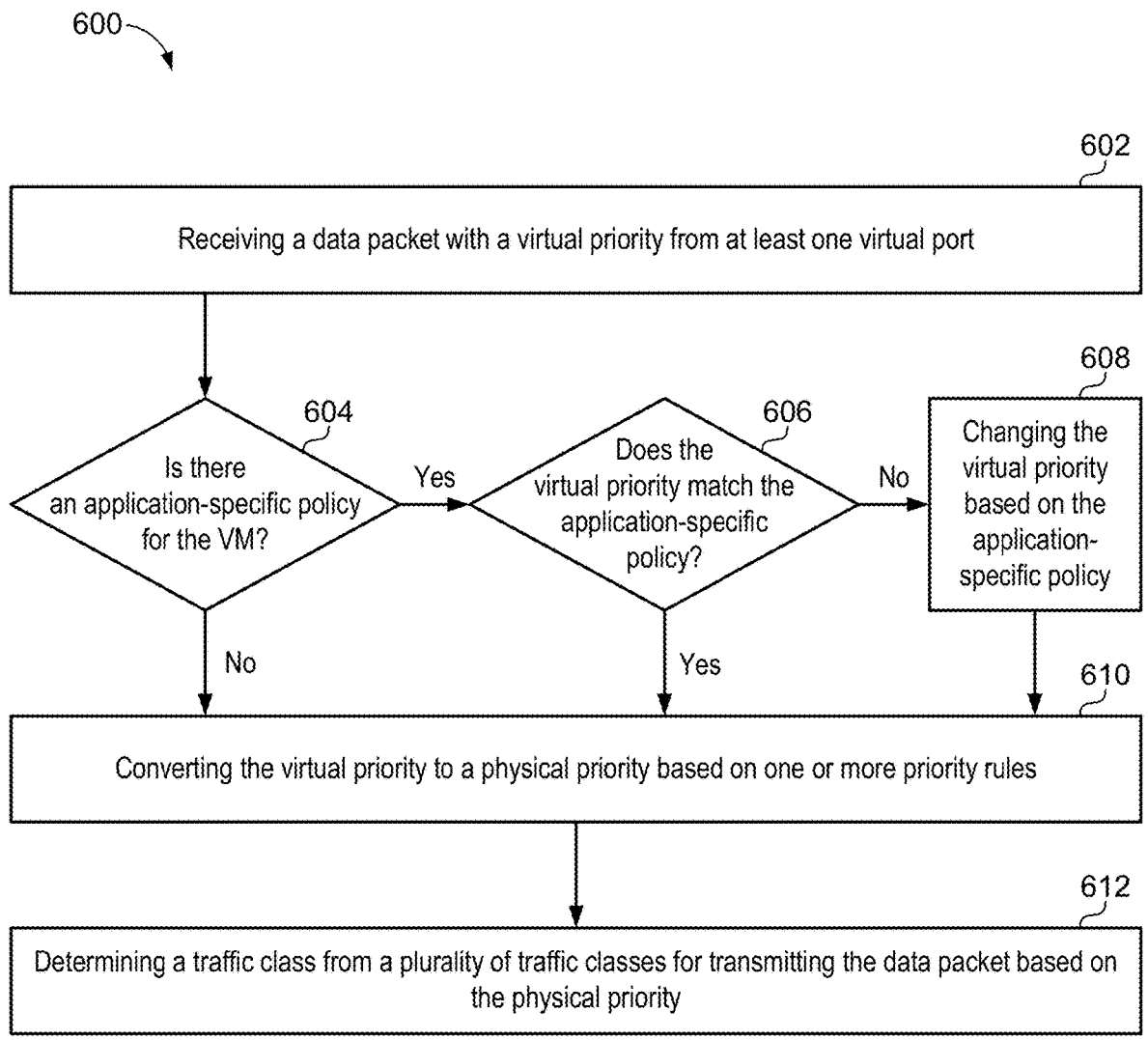
FIG. 6 is a flowchart of an example method for restricting data traffic received from a virtual port to a subset of traffic classes in accordance with an implementation of the present disclosure.

Referring now to FIG. 6, an example method 600 may be used by NIC 21 (FIG. 1) and/or host administrator component 26 (FIG. 1) of computer device 102 (FIG. 1) to restrict data traffic received from a virtual machine 106 (FIG. 1) to a subset of traffic classes 34 (FIG. 1).

At 602, method 600 may include receiving a data packet with a virtual priority from at least one virtual port. NIC 21 and/or host administrator component 26 may receive a data packet 12 from virtual machine 106. For example, data packet 12 may be transmitted via virtual NIC 17 in communication with virtual port 18. Each of the data packets 12 may include a virtual priority 14 assigned to the data packet 12 by an application 10 operating on the virtual machine 106. In an implementation, operating system 110 may also have virtual NICs outside of virtual machine 106 connected to virtual port 18. As such, applications running on top of the virtual NICs outside of virtual machine 106 may be subjected to the same policies as applications 10 running on top of virtual NICs 17 inside a virtual machine 106.

At 604, method 600 may include determining whether there is an application-specific policy for the virtual machine. Host administrator component 26 may include a verification component 46 operable to verify whether the virtual priority 14 of data packet 12 corresponds to application-specific policies 50 that may be defined for application 10. For example, an application-specific policy 50 may include mapping RDMA traffic received from application 10 to priority value 5. For example, host administrator component 26 may communicate the application-specific policy 50 to NIC 21.

At 606, method 600 may include determining whether the virtual priority matches the application-specific policy. Verification component 46 may check whether the virtual priority 14 of data packets 12 received from application 10 correspond to the correct priority value for the application-specific policy 50. If the virtual priority 14 does correspond to the correct priority value, verification component 46 may not need to perform additional processing on data packet 12.

At 608, method 600 may include changing the virtual priority based on the application-specific policy when the virtual priority does not match the application-specific policy. However, if the virtual priority 14 does not correspond to the correct priority value, verification component 46 may need to replace the virtual priority 14 of data packet 12 with a modified virtual priority 48 based on the application-specific policy 50. For example, an application-specific policy 50 may include mapping RDMA traffic to priority value 5. If a RDMA data packet was tagged with a virtual priority value of 2, verification component 46 may replace the virtual priority value 2 with a modified virtual priority value 5. Moreover, if virtual machine 106 sends untagged Ethernet and RDMA traffics, which maps to the same physical priority 32, host administrator component 26 may use verification component 46 to move the RDMA traffic to a different (maybe lossless) traffic class 34, while keeping the Ethernet traffic on the original traffic class 34. In addition, host administrator component 26 may instruct NIC 21 to change the virtual priority 14 of the received data packet 12 to a modified virtual priority 48.

At 610, method 600 may include converting the virtual priority to a physical priority based on one or more priority rules. For example, host administrator component 26 may use a virtual priority mapping table 44 to convert the virtual priority 14 of the received data packet 12 to a corresponding physical priority 32. The one or more priority rules may define the mappings between the virtual priority 14 value and the physical priority 32 value. For example, virtual priority mapping table 44 may have the following priority rules: virtual priority values 0-5 map to physical priority value 2, virtual priority value 6 maps to physical priority value 3, and virtual priority value 7 maps to physical priority value 4, which is PFC enabled on the physical network.

Host administrator component 26 may have a virtual priority mapping table 44 for each virtual machine 106. By using the virtual priority mapping table 44, host administrator component 26 may ensure that data packets 12 received from virtual machine 106 are transmitted using the correct physical priorities 32 assigned to the virtual machine 106. Thus, regardless of how virtual machine 106 tagged data packet 12, host administrator component 26 may restrict traffic from virtual machine 106 to the allowed traffic classes 34. If virtual machine 106 attempts to use different traffic channels than the traffic channels assigned to virtual machine 106, the virtual priority mapping table 44 may be used to restrict the data traffic received from virtual machine 106 to the correct traffic channels. Host administrator component 26 may replace the virtual priority 14 of data packet 12 with the corresponding physical priority 32 based on the virtual priority mapping table 44. For example, host administrator component 26 may instruct NIC 21 to convert the virtual priority 14 of data packet 12 with a corresponding physical priority 32 based on the virtual priority mapping table 44.

At 612, method 600 may include determining a traffic class from a plurality of traffic classes for transmitting the data packet based on the physical priority. Host administrator component 26 may also use a physical priority mapping table 30 to determine the corresponding traffic class 34 for the physical priority 32. Host administrator component 26 may notify NIC 21 of the corresponding traffic class 34 of physical priority 32 so that data packet 12 may be transmitted on the traffic channel for the corresponding traffic class 34.

Figure 7:
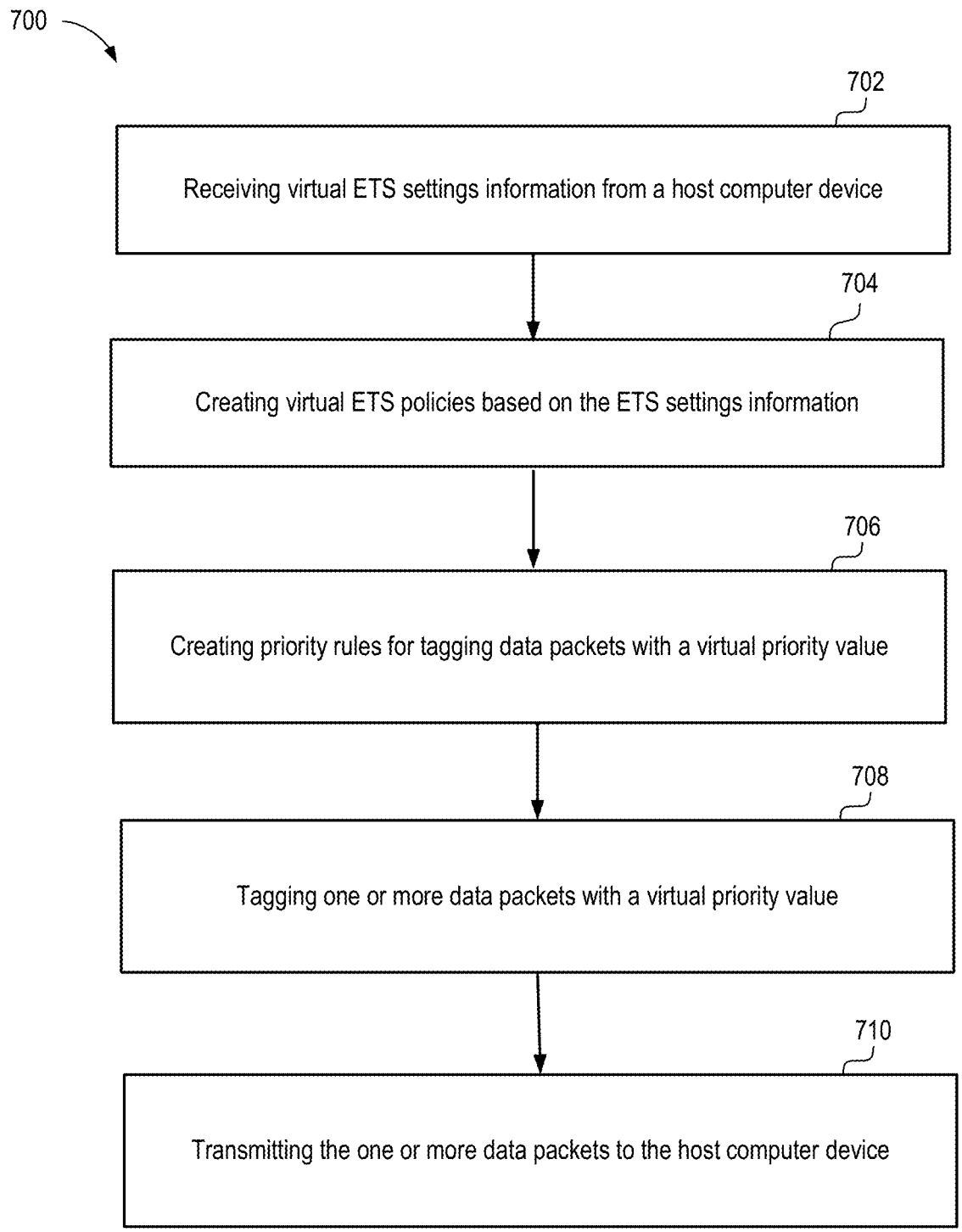
FIG. 7 is a flowchart of an example method for tagging data packets with a virtual priority value in accordance with an implementation of the present disclosure.

Referring now to FIG. 7, an example method 700 may be used by virtual administrator component 20 (FIG. 1) and/or one or more applications 10 (FIG. 1) in a virtual machine 106 (FIG. 1) for tagging data packets 12 (FIG. 1) with a virtual priority value 14 (FIG. 1) in accordance with an implementation of the present disclosure.

At 702, method 700 may include receiving virtual ETS settings information from a host computer device. A virtual administrator component 20 on virtual machine 106 may receive the virtual ETS settings 38 from computer device 102. The virtual ETS settings 38 may identify a number of virtual ETS channels that virtual machine 106 may use. For example, host administrator component 26 on computer device 102 may inform virtual network adapter 16 on virtual machine 106 the number of virtual ETS channels virtual machine 106 may access, so virtual network adapter 16 may inform the virtual network stack.

At 704, method 700 may optionally include creating virtual ETS policies based on the ETS settings information. For example, virtual administrator component 20 may create virtual ETS policies 24 that map virtual priorities 14 assigned to data packets 12 to the virtual traffic classes 40 received in the virtual ETS settings 38. Virtual ETS policies 24 may map 802.1p priorities to the virtual ETS channels assigned to virtual machine 106. For example, virtual machine 106 may have two virtual ETS channels assigned to virtual machine 106. As such, virtual traffic class policy 24 may map priority values 0 and 2 to traffic channel 1 and may map priority values 1 and 3-7 to traffic channel 2.

At 706, method 700 may include creating priority rules for tagging data packets with a virtual priority value. Virtual administrator component 20 may also create one or more virtual priority rules 22 that determine how applications 10 may tag data packets 12 with a virtual priority value 14. For example, the virtual priority rules 22 may indicate that SMB storage traffic may be tagged with a virtual priority value 5 and lossless traffic may be tagged with a virtual priority value 7.

At 708, method 700 may include tagging one or more data packets with a virtual priority value. Applications 10 may tag data packets 12 with one or more virtual priority values 14 based on the priority rules 22. As such, applications 10 operating on virtual machine 106 may have the ability to tag data packets 12 with any priority value in a similar manner as applications operating in a native environment.

At 710, method 700 may include transmitting one or more data packets to a host computer device. Virtual network adapter 16 may transmit one or more data packets 12 to host administrator component 26 via virtual port 18.

Figure 8:
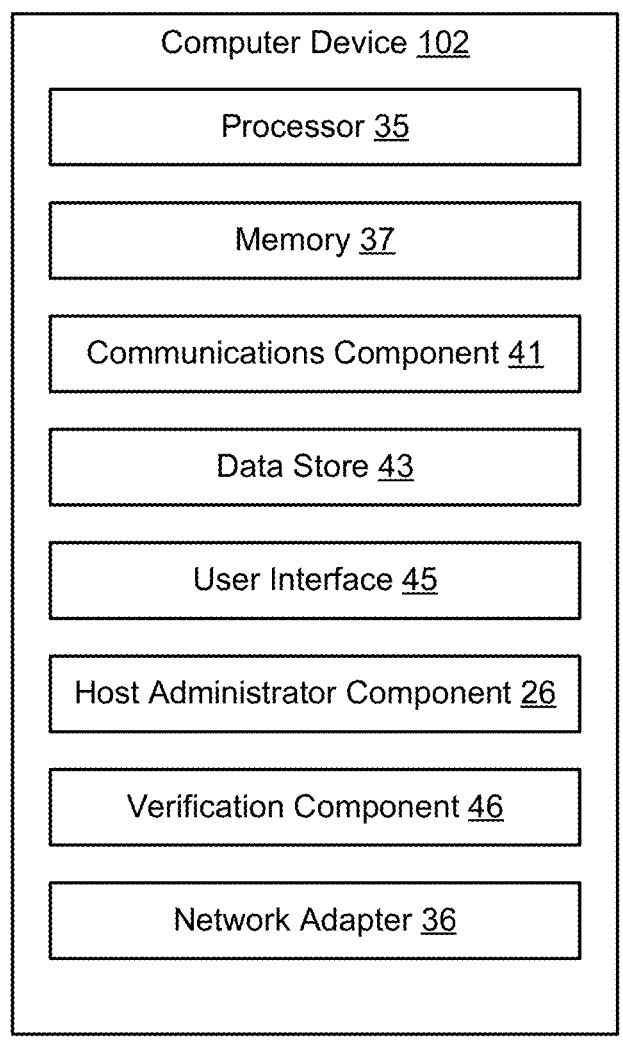
FIG. 8 is a schematic block diagram of an example computer device in accordance with an implementation of the present disclosure.

Referring now to FIG. 8, an example computer device 102 in accordance with an implementation may include additional component details as compared to FIG. 1. In one example, computer device 102 may include processor 35 for carrying out processing functions associated with one or more of components and functions described herein. Processor 35 can include a single or multiple set of processors or multi-core processors. Moreover, processor 35 can be implemented as an integrated processing system and/or a distributed processing system.

Computer device 102 may further include memory 37, such as for storing local versions of applications being executed by processor 35. Memory 37 can include a type of memory usable by a computer, such as random access memory (RAM), read only memory (ROM), tapes, magnetic discs, optical discs, volatile memory, non-volatile memory, and any combination thereof. Additionally, processor 35 and memory 37 may include and execute host administrator component 26 (FIG. 1), verification component (FIG. 1), and/or network adapter 36 (FIG. 1).

Further, computer device 102 may include a communications component 41 that provides for establishing and maintaining communications with one or more parties utilizing hardware, software, and services as described herein. Communications component 41 may carry communications between components on computer device 102, as well as between computer device 102 and external devices, such as devices located across a communications network and/or devices serially or locally connected to computer device 102. For example, communications component 41 may include one or more buses, and may further include transmit chain components and receive chain components associated with a transmitter and receiver, respectively, operable for interfacing with external devices.

Additionally, computer device 102 may include a data store 43, which can be any suitable combination of hardware and/or software, that provides for mass storage of information, databases, and programs employed in connection with implementations described herein. For example, data store 43 may be a data repository for host administrator component 26, verification component, network adapter 36, physical priority mapping table 30 (FIG. 1), ETS Settings 28 (FIG. 1), Virtual ETS settings 38 (FIG. 1), and/or virtual priority mapping table 44 (FIG. 1).

Computer device 102 may also include a user interface component 45 operable to receive inputs from a user of computer device 102 and further operable to generate outputs for presentation to the user. User interface component 45 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 45 may include one or more output devices, including but not limited to a display, a speaker, a haptic feedback mechanism, a printer, any other mechanism capable of presenting an output to a user, or any combination thereof.

In an implementation, user interface component 45 may transmit and/or receive messages corresponding to the operation of host administrator component 26, verification component, and/or network adapter 36. In addition, processor 35 executes host administrator component 26, verification component, and/or network adapter 36 or data store 43 may store them.

Thus, in some implementations, the described device and methods enable virtualization of DCB information to each vNIC so that applications on top of each vNIC can auto-discover DCB policy configured for that vNIC, which allows the applications to work in virtualization environment as they would in native environment.

Alternatively or in addition, in some implementations, the described device and methods enable virtualization of DCB information to each vNIC, so that DCB settings on each host vNIC is abstracted from the underlying physical NIC DCB settings.

Alternatively or in addition, in some implementations, the described device and methods enable virtualization auto-correct classification of application-specific traffic coming out of each vNIC, so that application owners do not need to be DCB-aware in order for the application traffic to be sent on the correct DCB traffic class.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory;
   an operating system in communication with the processor and the memory, wherein the operating system is configured to:
   determine a plurality of traffic classes for data packets transmitted on a physical network;
   determine at least one virtual enhanced transmission selection (ETS) setting that specifies available traffic classes of the plurality of traffic classes for use by at least one virtual machine in communication with the computer device, wherein the virtual ETS setting is different from datacenter bridging (DCB) settings for the physical network and the virtual ETS setting includes at least one virtual traffic class and traffic class characteristics for the available traffic classes, and wherein the at least one virtual traffic class is further divided into multiple priority values and a mapping table maps the multiple priority values to physical priority values; and
   transmit a notification to the at least one virtual machine identifying the virtual ETS setting, wherein applications operating on the at least one virtual machine use information from the virtual ETS setting to select priority values for tagging data packets.

2. The computer device of claim 1, wherein the at least one virtual machine uses the at least one virtual traffic class for transmitting the data packets from the at least one virtual machine to the computer device.

3. The computer device of claim 1, wherein different virtual machines have different virtual ETS settings.

4. The computer device of claim 1, wherein the operating system is further configured to:
   assign each of the plurality of traffic classes at least one physical priority value from a plurality of physical priority values.

5. The computer device of claim 1, wherein the plurality of traffic classes correspond to one or more virtual ETS channels for transmitting the data packets.

6. The computer device of claim 5, wherein different traffic classes have different quality of service for the data packets transmitted on the one or more virtual ETS channels.

7. The computer device of claim 1, wherein the operating system is further configured to abstract datacenter bridging (DCB) settings for the at least one virtual machine from underlying physical network datacenter bridging (DCB) settings.

8. The computer device of claim 1, wherein the operating system is further configured to specify one or more of the plurality of traffic classes for use by the at least one virtual machine to transmit the data packets.

9. The computer device of claim 1, wherein the virtual ETS settings provide the applications operating on the at least one virtual machine the ability to use any priority value of the priority values for tagging the data packets.

10. A method for determining settings for a virtual machine, comprising:
    determining, at an operating system on a computer device, a plurality of traffic classes for data packets transmitted on a physical network;
    determining at least one virtual enhanced transmission selection (ETS) setting that specifies available traffic classes of the plurality of traffic classes for use by at least one virtual machine in communication with the computer device, wherein the virtual ETS setting is different from datacenter bridging (DCB) settings for the physical network and the virtual ETS setting includes at least one virtual traffic class and traffic class characteristics for the available traffic classes, and wherein the at least one virtual traffic class is further divided into multiple priority values and a mapping table maps the multiple priority values to physical priority values; and
    transmitting a notification to the at least one virtual machine identifying the virtual ETS setting, wherein applications operating on the at least one virtual machine use information from the virtual ETS setting to select priority values for tagging data packets.

11. The method of claim 10, wherein the at least one virtual machine uses the at least one virtual traffic class for transmitting the data packets from the at least one virtual machine to the computer device.

12. The method of claim 10, wherein the at least one virtual machine has different virtual datacenter bridging (DCB) settings than other virtual machines in communication with the computer device.

13. The method of claim 10, further comprising:
assigning each of the plurality of traffic classes at least one physical priority value from a plurality of physical priority values.

14. The method of claim 10, wherein the plurality of traffic classes correspond to one or more virtual ETS channels for transmitting the data packets.

15. The method of claim 14, wherein different traffic classes have different quality of service for the data packets transmitted on the one or more virtual ETS channels.

16. A non-transitory computer-readable medium storing instructions executable by a computer device, comprising:
at least one instruction for causing the computer device to determine a plurality of traffic classes for data packets transmitted on a physical network;
at least one instruction for causing the computer device to determine at least one virtual enhanced transmission selection (ETS) setting that specifies available traffic classes of the plurality of traffic classes for use by at least one virtual machine in communication with the computer device, wherein the virtual ETS setting is different from datacenter bridging (DCB) settings for the physical network and the virtual ETS setting includes at least one virtual traffic class and traffic class characteristics for the available traffic classes, and wherein the at least one virtual traffic class is further divided into multiple priority values and a mapping table maps the multiple priority values to physical priority values; and
at least one instruction for causing the computer device to transmit a notification to the at least one virtual machine identifying the virtual ETS setting, wherein applications operating on the at least one virtual machine use information from the virtual ETS setting to select priority values for tagging data packets.

17. The computer-readable medium of claim 16, wherein the at least one virtual machine uses the at least one virtual traffic class for transmitting the data packets from the at least one virtual machine to the computer device.

18. The computer-readable medium of claim 16, wherein different virtual machines have different virtual ETS settings.

\* \* \* \* \*